(12) United States Patent
Manalis

(10) Patent No.: US 6,473,187 B1
(45) Date of Patent: Oct. 29, 2002

(54) HIGH-SENSITIVITY INTERFEROMETRIC ACCELEROMETER

(75) Inventor: Scott Manalis, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 193 days.

(21) Appl. No.: 09/638,210

(22) Filed: Aug. 11, 2000

Related U.S. Application Data

(60) Provisional application No. 60/174,875, filed on Jan. 7, 2000.

(51) Int. Cl.[7] .............................................. G01B 9/026
(52) U.S. Cl. .................................... 356/521; 73/514.26
(58) Field of Search ............................... 356/499, 521; 73/514.01, 514.26

(56) References Cited

U.S. PATENT DOCUMENTS

| | | | | |
|---|---|---|---|---|
| 5,420,688 A | * | 5/1995 | Farah | 356/477 |
| 5,633,960 A | | 5/1997 | Lagakos et al. | 385/12 |
| 5,684,298 A | | 11/1997 | O'Connor et al. | 250/231.1 |
| 5,903,349 A | | 5/1999 | Vohra et al. | 356/345 |
| 6,018,390 A | | 1/2000 | Youmans et al. | 356/345 |

OTHER PUBLICATIONS

Manalis, et al., "Interdigital cantilevers for atomic force microscopy," Appl. Phys. Lett. 69(25) pp. 3944–3946, Dec. 16, 1996.*

Manalis, et al., "Interdigital cantilevers for atomic force microscopy," Appl. Phys. Lett. 69(25) pp. 3944–3946, Dec. 16, 1996.

Liu, et al., "Characterization of a High–Sensitivity Micromachined Tunneling Accelerometer with Micro–g Resolution," Journal of Microelectromechanical Systems, vol. 7, No. 2, pp. 235–244, Jun. 1998.

* cited by examiner

Primary Examiner—Samuel A. Turner
Assistant Examiner—Patrick Connolly
(74) Attorney, Agent, or Firm—Testa, Hurwitz & Thibeault, LLP

(57) ABSTRACT

An accelerometer facilitates optical, interferometric measurement of acceleration. The device includes a proof mass having a first set of spaced-apart, elongated fingers projecting therefrom, and a stationary housing or substrate comprising a second set of similarly arranged projecting fingers. A spring connects the proof mass to the substrate such that, in a rest configuration, the first and second set of fingers interdigitate. When the structure is accelerated, the substrate fingers remain stationary, while the alternating fingers of the proof mass are displaced therefrom. This creates a phase-sensitive diffraction grating which, when illuminated, facilitates determination of the relative displacement between the sets of fingers by measuring the intensity of the diffracted modes. This displacement, in turn, indicates the acceleration experienced by the accelerometer structure.

6 Claims, 2 Drawing Sheets

HIGH-SENSITIVITY INTERFEROMETRIC ACCELEROMETER

RELATED APPLICATION

This application claims the benefits of U.S. Provisional Application Serial No. 60/174,875, filed on Jan. 7, 2000.

FIELD OF THE INVENTION

The present invention relates to measurement instruments, and in particular to accelerometers.

BACKGROUND OF THE INVENTION

An accelerometer measures the rate at which the velocity of an object is changing. A typical accelerometer utilizes a proof mass, a spring (or its equivalent) joining the proof mass to a stationary housing or substrate, and a sensor to measure displacement of the proof mass. The accelerometer is attached to the moving object, and as the object accelerates, inertia causes the proof mass to lag behind as its housing accelerates with the object. The force exerted on the proof mass (given by Newton's second law) is balanced by the spring, and because the displacement allowed by the spring is itself proportional to applied force, the acceleration of the object is proportional to the displacement of the proof mass.

The displacement sensor is the key component in determining overall accelerometer performance in terms of sensitivity, stability, and packaging constraints. Presently available devices utilize any of several sensing techniques, including capacitative, piezoresistive, piezoelectric, and tunneling approaches. The most sensitive accelerometers use a tunneling sensor, which can measure displacements as small as $10^{-4}$ Angstrom per root hertz. See, e.g., Liu et al., *J. Microelectromech. Sys.* 7:235 (1998).

Tunneling detection, however, is inherently nonlinear and requires the sensing electrodes to be in close proximity—typically 10 Å. Moreover, the tunneling sensitivity is strongly sensitive to electrode contamination from the ambient environment. To address these requirements, it is typically necessary to employ high-voltage feedback circuitry to control the position of the proof mass electrode relative to the tunneling electrode. The fabrication process that integrates electrostatic actuators for controling the proof mass is also complex, involving several photolithographic masks and wafer bonding.

DESCRIPTION OF THE INVENTION

BRIEF SUMMARY OF THE INVENTION

The present invention utilizes optical interference to measure displacement of the proof mass (and, consequently, acceleration of the moving object under study). This approach combines the reliability of optical devices, which are not affected by ambient electrical conditions, with sensitivities comparable to those of tunneling accelerometers. The invention is well-suited to fabrication of arrays that improve resolution through differential measurements.

A preferred embodiment utilizes a proof mass having a first set of spaced-apart, elongated fingers projecting therefrom, and a stationary housing or substrate comprising a second set of similarly arranged projecting fingers. A spring connects the proof mass to the substrate such that, in a rest configuration, the first and second set of fingers interdigitate. When the structure is accelerated, the substrate fingers remain stationary, while the alternating fingers of the proof mass are displaced. This creates a phase-sensitive diffraction grating which, when illuminated, facilitates determination of the relative displacement between the sets of fingers by measuring the intensity of the diffracted modes. This displacement, in turn, indicates the acceleration experienced by the accelerometer structure.

The illumination source and detector can be fabricated as a unit, or surface mounted on a circuit board such that they can be aligned within close proximity to the accelerometer.

BRIEF DESCRIPTION OF THE DRAWINGS

The foregoing discussion will be understood more readily from the following detailed description of the invention, when taken in conjunction with the accompanying drawings, in which.

The various elements may not be drawn to scale.

DETAILED DESCRIPTION OF THE PREFERRED EMBODIMENTS

Figure 1:
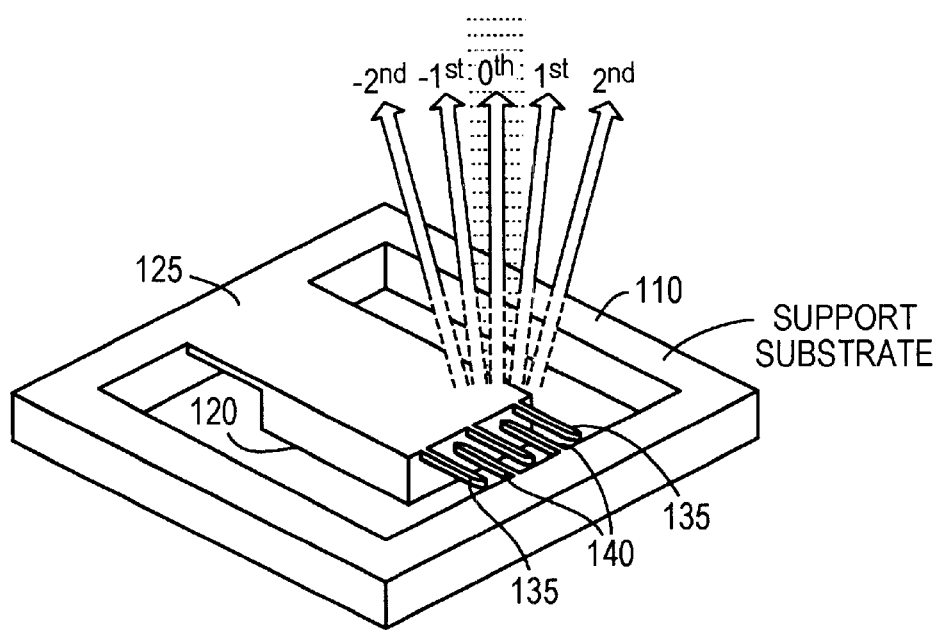
FIG. 1 is an isometric view of an accelerometer in accordance with the invention.
Figure 2:
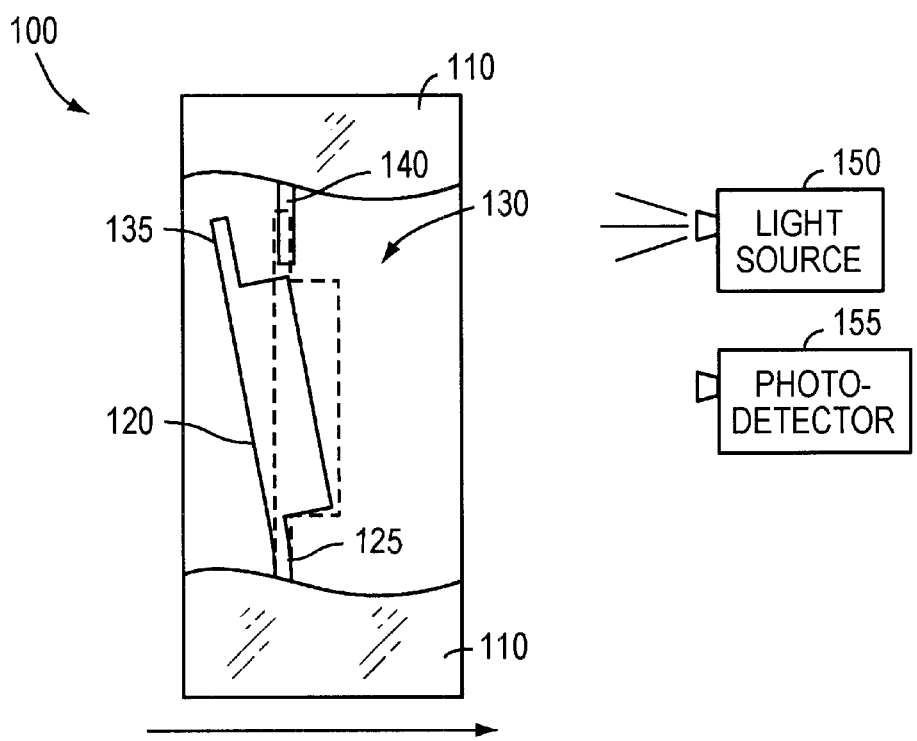
FIG. 2 is a partially cut-away side elevation of the accelerometer shown in FIG. 1.

With reference to FIGS. 1 and 2, a representative accelerometer 100 in accordance with the invention comprises a housing or substrate 110 and a proof mass 120, which is affixed to substrate 110 by means of a spring (i.e., a flexible cantilever) 125. As shown in FIG. 2, spring 125 permits side-to-side deflection of proof mass 120; with device 100 moving in the direction indicated by the arrow, inertia causes the proof mass 120 to deflect oppositely as shown. Proof mass 120 moves within a window 130 defined in the body of substrate 100.

A series of fingers 135 project from the end of proof mass 120 opposite the end affixed to spring 125. A complementary set of fingers 140 project from substrate 110 into the space defined by window 130 so as to alternate with proof-mass fingers 135. The device 100 can operate with as few as two fingers 135, 140, although the optimal number of fingers is ten. With proof mass 120 undeflected, as shown in phantom in FIG. 2, the fingers 135, 140 interdigitate in a coplanar fashion. When device 100 is accelerated, however, fingers 135 are displaced while fingers 140 remain fixed. The degree of displacement is determined by means of a monochromatic light source 150 (e.g., a laser) and a photodetector 155. The material of fingers 135, 140 is chosen to reflect the light emitted by source 150 so as to form a phase-sensitive diffraction grating (i.e., a reflection grating); the displacement between fingers 135, 140—and hence the force on spring 125 and the acceleration producing the force—may be determined by measuring the intensity of the diffracted modes.

As shown in FIG. 1, when the fingers 135, 140 are illuminated, the light is diffracted into a series of optical beams that correspond to different reflection modes. In the far field, the lateral spacing between the beams is approximately $2h\lambda/d$, where h is the separation between fingers 135, 140 and photodetector 155 (see FIG. 2), d is the spacing between fingers 135, 140, and $\lambda$ is the illumination wavelength. In other words, if h is assumed to lie along the z axis, the lateral spacing among beams occurs on the x,y plane. In a typical implementation, d=6 $\mu$m, h is a few centimeters, and λ may be 635 nm. This provides a lateral spacing of a few millimeters between the diffraction-mode spots. The fingers 135, 140 may be on the order of 3 μm in width and spaced apart by a pitch of 6 μm, while proof mass 120 may be on the order of 3 mm.

Figure 3:
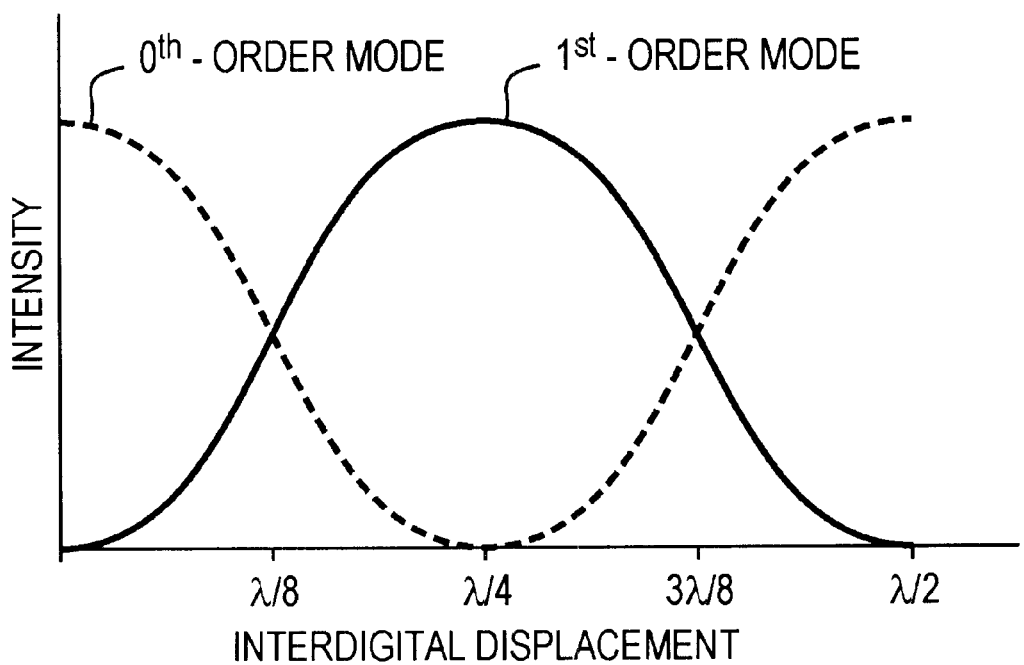
FIG. 3 graphically illustrates the relationships between the zeroth- and first-order modes of reflection and cantilever deflection.

As conceptually illustrated in FIGS. 1 and 3, when the reflective grating formed by fully interdigitated fingers 135, 140 is illuminated with monochromatic light, the majority of the light will be reflected back toward the source; this is the "zeroth" mode of reflection. The intensity of the $0^{th}$-order beam varies as $\cos^2(2\pi s/\lambda)$, where s is the displacement between fingers 135, 140 shown in FIG. 2. If fingers 135, 140 are displaced from each other by a distance equal to one-fourth of the illumination wavelength, λ, the $0^{th}$-order mode is cancelled and most of the light is diffracted into two first-order modes of reflection (i.e., the $-1^{st}$-order mode and the $+1^{st}$-order mode, depending on the direction of motion); this occurs because the light reflected by one set of fingers partially interferes with the light reflected by the other set of fingers. If the alternating fingers are separated by λ/4, light from the displaced fingers 135 is delayed by half a wavelength relative to light reflected by fingers 140, and destructively interferes with that light. Accordingly, the intensity of the $0^{th}$-order mode is minimal at a spacing of λ/4, where the $1^{st}$-order modes are maximal; the intensity variations vary sinusoidally with a period of λ/2. The best performance therefore occurs with displacements around λ/8, since at this point in the curve the slope variation is maximal (so that a given displacement produces the greatest measurable effect on intensity).

Because the optical beams are spaced apart from each other (on the x,y plane) at the point of detection, photodetector 155 can be configured to detect particular modes merely by restricting the x,y field of view to the location(s) of the desired mode(s). It may be worthwhile, for example, to simultaneously examine multiple modes to improve accuracy. Thus, instead of estimating finger displacement by reference solely to the $0^{th}$-order or a $1^{st}$-order mode, it may be preferable to compute displacement from a composite intensity measurement derived from multiple modes, such as difference, a sum, or a ratio such as $(0^{th}-1^{st})/(0^{th}+1^{st})$.

Photodetector 155 may be a solid-state device utilizing one or more semiconductor photodiodes, which detect light when photons excite electrons from immobile, bound states of the semiconductor (the valence band) to mobile states (the conduction band) where they may be sensed as a photoinduced current. Even a single photodiode may be used to record the intensity of a given diffracted mode. In general, photodetector 155 is positioned adjacent light source 150.

The device 100 may be fabricated using a two-mask process. A representative manufacturing sequence begins with a 500 μm-thick, double-side polished <100> silicon wafer. First, the thickness of the interdigital fingers 135, 140 are defined with a deep reactive ion etch (DRIE), with typical etch depths between 15 and 30 μm. The front side pattern (i.e., the face illustrated in FIG. 1) is protected with a thick layer of photoresist and mounted to a quartz carrier wafer. A second DRIE etch is then used to define and release proof mass 120 from the back side. The device wafer is dismounted from the carrier wafer with an overnight soak in acetone and subsequently rinsed in methanol, 2-propanol, and water.

Since this process does not include a buried etch stop, the back-side etch is timed and individual devices protected with photoresist once the proof mass is released. While most of the devices survive the release, induced stress between the device wafer and carrier is found to crack the interdigital beams on the majority of devices. It is anticipated that the process can be improved by adding a buried etch stop and eliminating the carrier wafer.

A device fabricated in accordance with this technique was found to detect accelerations on the order of 2 $\mu g/\sqrt{Hz}$ at 650 Hz. Because the response is linear over displacements on the order of 100 Å, external feedback circuitry may not be necessary.

Although the present invention has been described with reference to specific details, it is not intended that such details should be regarded as limitations upon the scope of the invention, except as and to the extent that they are included in the accompanying claims.

What is claimed is:

1. An accelerometer comprising:
   a. a proof mass comprising a first set of spaced-apart, elongated fingers projecting therefrom;
   b. a substrate comprising a second set of spaced-apart, elongated fingers projecting therefrom;
   c. a spring connecting the proof mass and substrate such that, in a rest configuration, the first and second set of fingers interdigitate, the first set of fingers being displaced from the second set of fingers by acceleration; and
   d. a sensor for detecting acceleration based on displacement between the sets of fingers.

2. The accelerometer of claim 1 wherein the sensor comprises:
   a. a source of monochromatic light directed at the sets of fingers, the fingers causing diffraction of the light; and
   b. an optical detector for measuring the diffracted light to determine the displacement between the first and second sets of fingers.

3. The accelerometer of claim 2 wherein the detector is configured to measure at least one of −1, 0, and +1-order diffraction modes.

4. The accelerometer of claim 3 wherein the detector is configured to measure a plurality of diffraction modes.

5. A method of measuring acceleration, the method comprising the steps of:
   a. providing a proof mass comprising a first set of spaced-apart, elongated fingers projecting therefrom;
   b. providing a substrate comprising a second set of spaced-apart, elongated fingers projecting therefrom, the proof mass and substrate being flexibly connected such that, in a rest configuration, the first and second set of fingers interdigitate;
   c. accelerating the proof mass so as to displace the first set of fingers from the second set of fingers; and
   d. measuring the acceleration based on displacement between the sets of fingers.

6. The method of claim 5 wherein the measurement step comprises:
   a. directing a source of monochromatic light at the sets of fingers, the fingers causing diffraction of the light; and
   b. detecting the diffracted light and, based thereon, determining the displacement between the first and second sets of fingers.

* * * * *